Patented Feb. 5, 1935

1,989,712

UNITED STATES PATENT OFFICE 1,989,712

PROCESS OF PRODUCING WALL PLASTER

Eugene P. Schoch, Austin, Tex.

No Drawing. Application July 15, 1932,
Serial No. 622,833

2 Claims. (Cl. 106—34)

My invention relates to the manufacture of plaster and more particularly has reference to its production from gypsum.

The commercial manufacture of plaster of Paris (or of gypsum plaster) has always been by calcining gypsum, that is by heating it by itself, or dry, until its content of water of crystallization has been reduced to about 6.2%. This per cent of water corresponds to the formula of the hemi-hydrate $CaSO_4$, one-half $H_2O$, or $2CaSO_4, H_2O$. However, laboratory preparations of the hemi-hydrate by wet methods have also been made. Thus Hoppe-Seyler, in Pogg. Ann. 127, 161 (1886) states that he prepared hemi-hydrate by heating gypsum with water in a closed tube at 140–160 degrees C.; but he did not say anything as to whether this material would set to a hard mass when mixed with cold water, and it is unlikely that he tried the latter. LeChatelier repeated this method of preparation, Compt. rend 96, 1668 (1893), but stated that this material sets "less rapid and less completely than plaster". Davis found (J. Soc. Chem. Ind. 26, 733 (1907) at the end of page) that the hemi-hydrate can also be made by simply boiling gypsum in water for several hours; the resulting product had the right composition for plaster, but Davis found that this material set "very slowly and incompletely".

Davis (loc. cit. top of page 734) claims to have found that there are two distinct hemi-hydrates differing in crystal form. But the existence of two distinct crystal forms has since been claimed to be disproven (Jour. Am. Chem. Soc. 51, 360; Z. anorg. Chem. 137, 414; Z. anorg. Chem. 90 348). It is evident that a mixture of anhydrite and a suitable amount of gypsum would, upon analysis, be able to show 6.2% of water yet it certainly would not set. Thus we may have either a non-setting hemi-hydrate present or a mixture of anhydrite and gypsum in suitable proportion to give 6.2% of water. The presence of either would account for a non-setting of the mass. The microscope does not help in deciding between these possibilities because small crystals are not easily distinguished, particularly when they are quite similar in shape, and furthermore it is known that pseudo morphs are frequently formed in these transformations of one crystal form of calcium sulphate to another, and these naturally mislead the observer completely. Hence it appears to be impossible to tell from either the appearance of the crystals or from the per cent of water whether or not the material will set; only a definite trial can decide this question.

The preparation of hemi-hydrate of calcium sulphate by (wet) methods has been carried on in the laboratory by many investigators but, aside from the above statements, there appear to be no other statements from any of the investigators which would indicate whether or not the hemi-hydrate they obtained would set, and there is not even a hint given as to whether or not any setting trials have been made.

The hemi-hydrates have been analyzed and their crystal forms have been studied under the microscope, and it is evident from what has been pointed out above that these means are insufficient to decide whether or not a particular preparation would set or not.

Thus H. Rose, in 1845 (Pogg. Ann. 93, 606) boiled gypsum with sodium sulphate solution and obtained anhydrite. Hoppe-Seyler, in 1866 (Pogg. Ann. 127, 161) made hemi-hydrate by heating gypsum with a saturated NaCl solution in a closed tube to 125° C. He also obtained the same result with $CaCl_2$ solution. Van't Hoff in 1900 (see Zeitschr. fer phys. Ch. 45, 257) made hemi-hydrate, soluble anhydrite, and insoluble anhydrite by means of solutions of $HNO_3$, $H_2SO_4$, and solutions of NaCl, $CaCl_2$, $MgCl_2$ and $NaBrO_3$. The object of Van't Hoff's work was to measure the vapor pressure relations involved in the transformations of these four forms of calcium sulphate, and his final measurements were made with solutions of NaCl, $MgCl_2$, and $NaBrO_3$. Nowhere in his publications does it appear that he tested the setting qualities of the hemi-hydrate samples which he obtained; he identified them only by their crystal form, and by the water content.

It is quite likely that this laboratory work led others to try to make plaster by means of solutions, yet no report of any successful result can be found in the literature, and it is a current belief among technical men that a serviceable plaster cannot be made in this manner. Furthermore, it should be realized that, as far as our general knowledge of the action of these solutions is concerned, this action consists merely in a properly regulated dehydration, and all above mentioned solutions should serve equally well.

In contradistinction to the above present-day knowledge of the action of salt solutions I have found that, when gypsum is suspended in "boiling hot" solutions containing 23% or more of $MgSO_4$ for several hours, then it is converted into a "plaster" which sets up in 5 to 40 minutes to a mass perceptibly harder and stronger and denser than that obtained from the commercially made plaster from the same gypsum. On further experimenting I have found that, when the boiling is done under a slight extra pressure so as to raise the boiling point to 105–107° C., a uniformly good product is obtained in one hour with a 30% $MgSO_4$ solution, but that at still higher temperatures the product becomes less desirable. At 114° C. with a 30% $MgSO_4$ solution the products obtained would not set. Thus with 30% $MgSO_4$ solution, a temperature of 105–107° C. was found to be the most desirable.

Furthermore, it should be emphasized that $MgSO_4$ has not been mentioned in the literature as a salt used in connection with experiments on the dehydration of gypsum. Van't Hoff deliberately used salts which have no ion in common with $CaSO_4$; in other words he used salt solutions in which $CaSO_4$ is perceptibly more soluble than in water (e. g. NaCl, $MgCl_2$) and hence avoided solutions of $MgSO_4$ because the solubility of $CaSO_4$ is particularly small in it.

The exact procedure for making the plaster follows:

The granular or coarsely crystalline gypsum is suspended in about three times its weight of concentrated solution of magnesium sulphate (containing from about 23% or more of $MgSO_4$ and preferably 30%), and then the mixture is heated to its boiling point, or somewhat higher (preferably to a temperature between 105–107° C.) in a closed vessel. The length of time during which this heating is to be continued depends on the temperature and on the sizes of the particles; with the coarsely crystalline mass that I employed, and a 30% $MgSO_4$ solution, 1 hour's heating at 105–107° C. was sufficient to produce a well-setting plaster with a crystal water content of 5 to 7%.

The mixture is then filtered under conditions which prevent its being cooled appreciably below 100° C. Hence suction cannot be employed; instead, the filtering must be done by centrifuging, or under pressure in an apparatus which is kept at a temperature high enough to keep the mixture near 100° C. In my laboratory operation, I put the funnel inside of a "pressure cooker", heated the latter to 110° C., and applied pressure with air at 100 to 110° C. The solid is then washed with boiling hot water until all the soluble salts are removed; three to five washings with small amounts of hot water are required for this. The mass is then dried quickly (in 10 to 20 minutes) by being stirred in a drier which is heated gently from without and which has hot air passing through it, the heat maintained being such as to keep the solid between 100 and 110° C.

When the finished material is mixed with the proper amount of water, it sets in 5 to 40 minutes. After setting and drying thoroughly, the material has a smooth "glazed" surface; it is decidedly harder than the best grade of molding plaster. When struck with a hammer, it rings similarly to a piece of china ware. It is denser and harder than ordinary wall plaster or molding plaster made by calcining the same gypsum.

Thus a sample of this new or cooked paster, and a sample of calcined plaster made from the same gypsum sample, were made up with water in the same manner, and allowed to set and, after four weeks, their densities compared as follows:

|  | Apparent density | Real density |
|---|---|---|
| Calcined plaster | 1.29 | 1.95 |
| Cooked plaster | 1.55 | 2.14 |

Samples of the set-up new or cooked material have been soaked in water as long as three weeks: in no instance has the material disintegrated, nor even softened appreciably and, after drying, these samples were fully as hard as before and thoroughly intact. In this respect, this material behaves markedly different from regular commercial (calcined) wall plaster: the latter softens appreciably, always shows some disintegration, and in many cases it disintegrates entirely to a loose mass.

Test bricklets, made up in sets of 4 from different batches of plaster and tested several days after being made up, showed an average tensile strength (for each set of 4 bricklets) ranging from 450 lbs. to 600 lbs. per sq. inch, while bricklets made from plaster obtained by calcining the same gypsum showed average tensile values ranging from 330 lbs. to 415 lbs. per sq. inch. Eckels, in his book "Cements, Limes and Plasters" (3rd. Ed., J. Wiley & Sons, 1928) p. 66, gives tests of tensile strength of various neat plasters, and these range from 135 to 420 lbs. per sq. inch, with one exceptional value as high as 461 lbs. per sq. inch. On p. 68 he gives a large number of tests of commercial samples, and these range from 150 lbs. to 483 lbs. per sq. inch. From all this, it is evident that my cooked plaster sets to a much stronger mass than the calcined plaster.

It is evident to those familiar with plaster that before and during setting, this cooked plaster has the chemical composition and the properties of the regular (calcined) hemi-hydrate of calcium sulphate; but that after setting, it has the properties of Keene's cement namely, the set mass has a hardness and strength and "soaking" resistance which are essentially identical with those of the set mass from Keene's cement and which are vastly greater than those shown by the set mass from ordinary calcined hemi-hydrate plasters.

It is obvious that those skilled in the art may vary the steps and combinations of steps involved in the above procedure without departing from the scope of this invention and thereby produce a similar product; therefore it is not desired to be limited to the exact foregoing disclosure except as may be demanded by the claims.

What I claim is:—

1. The process of making wall plaster which consists in mixing granular gypsum with substantially three times its weight of a concentrated solution of $MgSO_4$; heating the mixture to at least its boiling point; filtering the mixture while maintaining the temperature thereof near 100° C.; removing all the soluble salts; and rapidly drying at a temperature near 100° C.

2. A process for producing plaster which comprises suspending gypsum in a solution containing at least 23% magnesium sulphate, heating the mixture to at least the boiling temperature of the solution, and then filtering the mixture at a temperature not appreciably below 100° C.

EUGENE P. SCHOCH.